(12) United States Patent
Miller (10) Patent No.: US 12,401,523 B2
(45) Date of Patent: Aug. 26, 2025

(54) HASHING MESSAGES WITH CRYPTOGRAPHIC KEY COMPONENTS

(71) Applicant: Garantir LLC, San Diego, CA (US)

(72) Inventor: Kieran Miller, San Diego, CA (US)

(73) Assignee: Garantir LLC, San Diego, CA (US)

(*) Notice: Subject to any disclaimer, the term of this patent is extended or adjusted under 35 U.S.C. 154(b) by 0 days.

(21) Appl. No.: 18/634,128

(22) Filed: Apr. 12, 2024

(65) Prior Publication Data

US 2024/0356759 A1 Oct. 24, 2024

Related U.S. Application Data

(60) Provisional application No. 63/530,293, filed on Aug. 2, 2023, provisional application No. 63/460,539, filed on Apr. 19, 2023.

(51) Int. Cl.
*H04L 9/32* (2006.01)
*G06F 21/64* (2013.01)

(52) U.S. Cl.
CPC .......... *H04L 9/3247* (2013.01); *G06F 21/645* (2013.01); *H04L 9/3236* (2013.01)

(58) Field of Classification Search
CPC .... H04L 9/3247; H04L 9/3236; G06F 21/645
See application file for complete search history.

(56) References Cited

U.S. PATENT DOCUMENTS

| | | | | |
|---|---|---|---|---|
| 2002/0138554 A1* | 9/2002 | Feigen | ................... | H04L 63/123 709/220 |
| 2008/0170694 A1* | 7/2008 | Ryan | ....................... | G06F 21/51 726/22 |
| 2014/0219443 A1* | 8/2014 | Brainis | ................. | H04L 9/0861 380/46 |
| 2018/0241550 A1* | 8/2018 | Hirschberg | ........... | H04L 9/0643 |
| 2018/0341786 A1* | 11/2018 | Godas-Lopez | ......... | G06F 21/64 |
| 2019/0372776 A1* | 12/2019 | Kroneisen | ................. | H04L 9/30 |
| 2020/0076579 A1* | 3/2020 | Alakuijala | ............ | H04L 9/0643 |

(Continued)

OTHER PUBLICATIONS

Windarta, Susila; Suryadi, Suryadi; Ramli, Kalamullah; Pranggono, Bernardi; Gunawan, Teddy Surya; "Lightweight Cryptographic Hash Functions: Design Trends, Comparative Study, and Future Directions," IEEE Access, vol. 10, Aug 2022, pp. 82272-82294.*

*Primary Examiner* — Victor Lesniewski
(74) *Attorney, Agent, or Firm* — Hickman Becker Bingham Ledesma LLP (57) ABSTRACT

Techniques for hashing messages with cryptographic key components are provided. In one technique, a message to be hashed with a private key component is identified. During a hash operation relative to the message involving a hash function, the client identifies an internal state of the hash function, which internal state is based on the message. The client sends the internal state of the hash function to a cryptographic device. The cryptographic device identifies a private key component and generates a final hash based on the private key component and the internal state of the hash function. In another technique, a client receives, from a cryptographic device, an internal state of a hash function, where the internal state is based on a private key component that is stored in the cryptographic device. Based on the internal state and a message, the client generates a final hash.

27 Claims, 4 Drawing Sheets

(56) References Cited

U.S. PATENT DOCUMENTS

| | | | | |
|---|---|---|---|---|
| 2021/0359853 | A1* | 11/2021 | Dalton | H04L 9/0643 |
| 2022/0086009 | A1* | 3/2022 | Vacek | H04L 9/3239 |
| 2022/0292225 | A1* | 9/2022 | Ito | G06F 21/606 |
| 2023/0163974 | A1* | 5/2023 | Mainardi | H04L 9/3255 |
| | | | | 713/170 |
| 2023/0222209 | A1* | 7/2023 | Almeida | G06F 21/51 |
| | | | | 726/23 |
| 2024/0097905 | A1* | 3/2024 | Laing | H04L 9/0869 |
| 2024/0179010 | A1* | 5/2024 | De Santis | H04L 9/3239 |

\* cited by examiner

FIG. 4

HASHING MESSAGES WITH CRYPTOGRAPHIC KEY COMPONENTS

CROSS REFERENCE TO RELATED APPLICATION; BENEFIT CLAIM

This application claims the benefit under 35 U.S.C. § 119(e) of provisional application 63/460,539 filed Apr. 19, 2023 and 63/530,293, filed Aug. 2, 2023, by Kieran Miller, the entire contents of which is hereby incorporated by reference. The applicant hereby rescinds any disclaimer of claim scope in the parent applications or the prosecution history thereof and advise the USPTO that the claims in this application may be broader than any claim in the parent application.

TECHNICAL FIELD

The present disclosure relates generally to digital signing and, more particularly, to, hashing messages with one or more components of a cryptographic key.

BACKGROUND

A digital signature is a mathematical scheme for verifying the authenticity of digital data. A valid digital signature, where the prerequisites are satisfied, provides authentication regarding the sender of a piece of data and ensures integrity regarding the contents of the data. In other words, a digital signature gives a recipient of the data strong reason to believe that the data was created by a known sender (authentication) and that the data was not altered since digitally signed (integrity).

Digital signatures may be part of one or more cryptographic protocol suites and may be used for software distribution, financial transactions, contract management, and in other cases where it is important to detect forgery or tampering.

Digital signatures employ asymmetric cryptography. In many instances, digital signatures provide a layer of validation and security to data sent through a non-secure channel. Digital signatures are analogous to traditional handwritten signatures in many respects, but properly implemented digital signatures are more difficult to forge than the handwritten type. Digital signature schemes are cryptographically based and must be implemented properly to be effective.

A digital signature scheme typically involves three algorithms:

(1) a key generation algorithm that selects a private key (e.g., at random) from a set of possible private keys. The algorithm outputs the private key and a corresponding public key;
(2) a signing algorithm that, given a message and a private key, produces a signature; and
(3) a signature verifying algorithm that, given the message, public key and signature, either accepts or rejects the message's claim to authenticity.

Two main properties are required for any digital signature scheme. First, the authenticity of a signature generated from a message and a private key can be verified by using the corresponding public key. Secondly, it should be computationally infeasible to generate a valid signature for a party without knowing that party's private key. A digital signature is an authentication mechanism that enables the creator of the message to attach a code that acts as a signature. The Digital Signature Algorithm (DSA), developed by the National Institute of Standards and Technology, is one of many examples of a signing algorithm.

Because the digital signature scheme involves generating a signature based on a piece of data, the time to generate the signature is proportional to the size of that data. Thus, the greater the number of bytes, the greater the time required to generate the signature. Another time consideration in generating a signature is the location of the hardware (referred to herein as a "cryptographic device") that stores the private key and generates the signature. If the cryptographic device is located remotely from the client that is requesting the signature, then the time to transmit the piece of data over a network (whether local or wide area) can be significant. Therefore, the size of the data that is to be digitally signed may have a significant impact on performance of the overall data distribution system that is responsible for making the data available to a consumer of the data, whether the consumer is a single recipient or the general public.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, some structures and devices are shown in block diagram form in order to avoid unnecessarily obscuring the present invention.

Code Signing

One example type of data that may be digitally signed is software code, such as compiled code that a compiler generates based on human-readable source code written in a programming language, such as Java, Python, Perl, or C++. Compiling source code entails converting a program (written in one or more source code files) into machine code or a lower level form in which the program may be executed. Digital signatures for such code are required in certain instances. For example, in order for a software application to be made available in an online application store (e.g., Apple's AppStore for iOS applications or Google's Play Store for Android applications), the software application must be digitally signed. A digital signature of a software application allows the online application store to verify that the software application was produced by a verifiable entity. As another example, an anti-virus policy for a server or computing device of an end-user may require that a program must be signed by one or more known trusted entities before the program is executed on the server/device.

Hash Signing

One approach for reducing the amount of time required to digitally sign a piece of data, such as compiled code of a large software program, with a key that is stored in a non-exportable state in a cryptographic device (e.g., a hardware security module) is to hash the data client-side, then send the hash to the cryptographic device to finalize the signature. This is referred to as "hash signing" or "client-side hashing". The data (e.g., an executable file) is input to a hash function that produces a hash value (or "hash") of a fixed size (e.g., 128 bits), regardless of the size of the data. Transmitting a hash over a network and signing the hash is much faster than transmitting and signing a large file. Also, the more data that a client sends over a network, the more space an attacker has to attack. For example, uploading executable code over a network allows an attacker to include malware into the executable code. By reducing the amount of data sent over a network, an attacker has much less data to attack and it is faster to work with less data. It is important to note that the resulting signature is exactly the same as if the entire process (including the hash function) were done by the cryptographic device, but the process is done much faster and exposes a smaller attack surface for attackers to exploit.

System Overview

Figure 1:
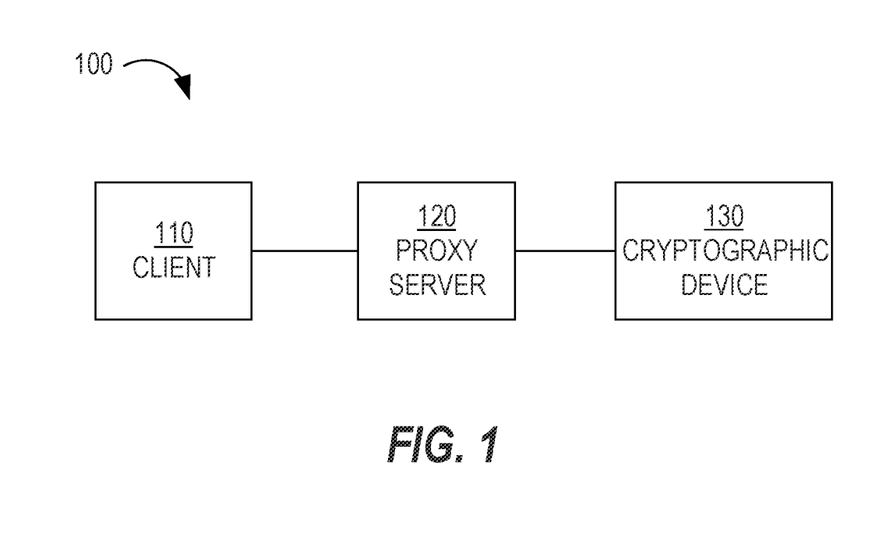
FIG. 1 is a block diagram that depicts an example system for performing hash validation, in an embodiment.

FIG. 1 is a block diagram that depicts an example system 100, in an embodiment. System 100 includes a client 110, a proxy server 120, and a cryptographic device 130. System 100 may include more computing elements than are depicted in FIG. 1, such as databases, servers, repositories, etc. The elements or components of system 100 may reside in different networks or in the same network. For example, system 100 is implemented in the same physical site (or premises) owned by a particular entity (e.g., a company) that requests digital signatures. As another example, system 100 is implemented in a virtual private cloud (VPC) that is part of a third-party cloud service, but that is dedicated to a single entity (e.g., a company) that requests digital signatures. Alternatively, some elements of system 100 may be implemented on a company's premises and other elements of system 100 may be implemented in a VPC that is dedicated to supporting the company.

Client 110 is software that executes on a computing device and is configured to communicate with proxy server 120. Client 110 is communicatively coupled to proxy server 120 over a computer network (not depicted). Examples of such a network include a local area network (LAN), a wide area network (WAN), and the Internet. Although only one client is depicted, system 100 may include multiple clients that are communicatively coupled to proxy server 120. In the case of multiple clients, a load balancer may sit between proxy server 120 (which may include multiple servers) and the multiple clients. The load balancer balances signature requests (from the multiple clients) among multiple servers such that each server has approximately the same load (e.g., as measured by the number of signature requests each server is currently processing).

In an embodiment, client 110 includes specialized software or code that executes on a computing device to communicate with proxy server 120. The specialized software or code is separate from application code that executes on client 110 and that includes separate business logic pertaining to task(s) client 110 is intended to perform. An example of client 110 is a build server that takes part in the build process to create, from source code, one or more executables of a software program. Another example of client 110 is a word processing application that allows for the digital signing of electronic documents, where a master copy of an electronic document is stored in a central document repository. Another example of client 110 is a computing device operated by a single person who directly requests a digital signature for a piece of data, such as application code.

Client 110 generates a hash for certain data for which an operator of client 110 wishes to ensure authentication and integrity. Client 110 relies on (e.g., implements) one or more hashing algorithms or techniques to generate a hash based on a piece of data. Examples of such data include a document, an email, and a file, such as a file containing executable code and or media data, such as video data and audio data.

Client 110 generates and transmits, to proxy server 120, a signature request that may include a hash and one or more parameters. Client 110 uses one or more techniques to communicate with proxy server 120. One example technique is using a RESTful API, which is an application programming interface that uses HTTP requests to GET, PUT, POST, and DELETE data. A RESTful API is based on representational state transfer (REST) technology, which is an architectural style and approach to communications used in web services development.

Proxy server 120 is responsible for providing a digital signature to client 110 (and, potentially, other clients, not depicted) upon receiving a signature request from client 110. Proxy server 120 may be implemented on one or more computing devices that are separate from the computing device upon which client 110 executes. As noted above, system 100 may include multiple instances of proxy server 120 that are able to process signature requests from one or more instances of client 110. The multiple instances may be implemented on one or more computing devices.

In response to receiving a signature request, proxy server 120 sends the signature request to cryptographic device 130, which selects a private key, generates a digital signature based on the private key and the hash, and returns the digital signature to proxy server 120. As described in U.S. Pat. No. 10,897,361, which is incorporated by reference as if fully disclosed herein, proxy server 120 may send the hash to cryptographic device 130 before or after validating the hash from client 110, if hash validation is performed at all. Proxy server 120 sits in between cryptographic device 130 and client 110, thus, hiding the complexity of client 110 having to interact directly with cryptographic device 130. In an alternative embodiment, client 110 interacts directly with cryptographic device 130 instead of interacting with proxy server 120 as an intermediary.

Cryptographic device 130 is a device that stores one or more private keys and that is accessible to server 120. Examples of cryptographic device 130 include a key manager, a hardware security module (HSM), and a software-based keystore. Cryptographic devices are also referred to as cryptographic tokens. Cryptographic device 130 may be remote or local relative to proxy server 120, which does not have direct access to the keys stored by cryptographic device 130, making system 100 secure. For example, cryptographic device 130 may be a software keystore that is implemented on the same computing device as client 110.

If cryptographic device 130 stores multiple private keys, then each key may be associated with a different key identifier (ID). Thus, a signature request from proxy server 120 may include a key ID, which may have originated in the corresponding signature request that proxy server 120 received from client 110.

Although system 100 depicts only one cryptographic device 130, system 100 may include multiple cryptographic devices that store keys for generating digital signatures for client 110. In other words, client 110 may, at different times, request digital signatures generated using different keys that are stored in different cryptographic devices.

System 100 may include other elements that are not depicted, such as (1) one or more administrative servers that allow administrators to perform certain duties (e.g., user management, key management) and (2) a message broker that allows proxy server 120, any administrative servers, or other computing elements to communicate.

General Overview

Previously, a client would hash a message (e.g., application code, a document, a file) first and then a cryptographic device signs the hash with a private key, the output of which is a digital signature. However, new hash algorithms require concatenating part of a cryptographic (or private) key with the message that is to be hashed. Therefore, either part of the key must come out of the safe space of the cryptographic device or the original message must be transported to the cryptographic device. Hash algorithms are not designed with cryptographic devices in mind. In a theoretical sense, the new hash algorithms are more secure, but in practice they are less secure when considering that a cryptographic key is stored separate from hashing devices that implement hash functions.

Transporting keys (or portions thereof) out of a cryptographic device to clients is not secure. Also, transporting messages (which could be very large) to a cryptographic device for hashing and then signing takes a long time, especially when the number of signing requests is relatively large.

Most hash functions work with internal states that allow the user to stream large amounts of data into the hash function while maintaining a small memory footprint. A hash function keeps an internal state. When hashing data, for every round, an actor keeps adding data to the hash function (e.g., one character at a time) and the internal state thereof keeps changing. However, it is not possible to derive the original input data from the internal state, or even to derive a previous internal state from a current internal state. The final step is where the actor calls "finalize" (with respect to the hash function) on the current internal state and the current internal state is finalized into a hash value. In other words, the internal state is the input to the final step of generating the hash value.

Example hash functions include MD5, SHA-1, SHA2 (224, 256, 384, 512), SHA3 (224, 256, 384, 512), and SHAKE.

A private key (PK) or a component thereof (PKC) may be prepended to a message that is to be hashed or may be appended to the message. A PKC may be a strict subset of the PK, such as the first N bits or bytes of a PK, or the last M bits or bytes of the PK. In some cases, there may be fixed data, which could be before the message or after the message. Some options include:
 a. Hash ([message] [fixed data] [PKC])
 b. Hash ([message] [PKC] [fixed data])
 c. Hash ([PKC] [message] [fixed data])
 d. Hash ([PKC1] [message] [PKC2] [fixed data])—different PKCs of the same PK There could be other options where there are more fixed data, the message is split up (e.g., Hash ([messagePart1] [PKC] [messagePart2]), and/or there are more PKCs. In options a-c, the PKC could be the entire PK.

The "fixed data" may be static or dynamic. Examples of fixed data include fixed/static values, part or all of the public key, the length of the message, iteration count, date/time value, a combination of these, or something else. Fixed data may originate from the client, the cryptographic device, or both. The client or the cryptographic device may put the fixed data into the hash function. In fact, both the client and the cryptographic device may put the fixed data into the hash function with part of the fixed data supplied by the cryptographic device and another part of the fixed data supplied by the client. Thus, the following variations may be implemented: (1) the client inputs fixed data that the client originates into a hash function; (2) the cryptographic device inputs fixed data that the cryptographic device originates into a hash function; (3) the client provides fixed data to the cryptographic device, which inputs the fixed data into its hash function; (4) the cryptographic provides fixed data to the client, which inputs the fixed data into its hash function; (5) the client provides first fixed data to the cryptographic device, which combines the first fixed data with second fixed data that the cryptographic device originates and inputs the combined fixed data into its hash function; (6) the cryptographic device provides first fixed data to the client, which combines the first fixed data with second fixed data that the client originates and inputs the combined fixed data into its hash function.

Proxy Server

In an embodiment involving a proxy server, a client sends a hash request to the proxy server. A hash request may include a client identifier that identifies the client so that the cryptographic device (and/or the proxy server) knows where to direct a response to the hash request. A hash request may also include a cryptographic device identifier that uniquely identifies the cryptographic device. This is helpful if the proxy server is communicatively coupled to multiple cryptographic devices. A hash request may also include an internal state of a hash function (that the client executed), data to be hashed (e.g., fixed data or data pointing to dynamic data), and/or specific instructions on what the cryptographic device is to input to a hash function. Thus, different clients may have different instructions, meaning that a cryptographic device may need to be configured to process the different instructions.

For example, the set of instructions in a hash request may be to (1) make the internal state of a hash function match the internal state in the hash request, then (2) add a PKC to the hash function, which modifies the internal state of the hash function, and then (3) send the modified internal state back to the client. As another example, the set of instructions in another hash request (from the same or different client) may be to (1) make the internal state of a hash function match the internal state in the hash request, (2) add a PKC to the hash function, which modifies the internal state of the hash function, (3) add dynamic data to the hash function, which further modifies the internal state of the hash function, (4) finalize the hash, and (5) return the resulting hash back to the client.

In a related embodiment, the proxy server is communicatively to multiple clients and/or multiple cryptographic devices. For example, a single client may send different hash requests to multiple cryptographic devices and a single cryptographic device may receive hash requests from multiple clients.

Append Scenario

There are two main scenarios for adding a PKC to a hash function: append and prepend. In the append scenario, the client identifies the internal state of a hash function after the client inputs the message and any fixed data into the hash function and sends the internal state to the cryptographic device (whether or not through a proxy server) and the cryptographic device, given the internal state, inputs the PKC to the hash function with the given internal state to generate a new internal state, and then finalizes the new internal state to obtain the final hash and then signs the hash with the PK.

In a variation of this append scenario, the client only inputs the message into the hash function (and not any fixed data) and then sends the internal state and the fixed data to the cryptographic device, which inputs the fixed data and the PKC into the hash function, given the internal state, which causes the generation of new internal state and then finalizes the new internal state to generate the final hash, which the cryptographic device digitally signs with the PK.

Prepend Scenario

In a prepend scenario where a PKC is prepended to a message from a client, the previous scheme (i.e., the append scenario) is modified by changing the order, where the client generates an internal state (based on the message) and sends the internal state to the cryptographic device, which updates the hash function with the internal state and inputs the PKC to the hash function, thus permitting use of the previous scheme. While this is a different signature scheme, the security strength of this scheme is substantially similar to the security strength of the prepend scheme.

One of the benefits of this approach is that only a small amount of data is sent over the network to the cryptographic device, conserving bandwidth and increasing performance. A common limit of the amount of data that may be sent to a cryptographic device is 64 KB. Signing documents and code is often measured in megabytes (MB) or gigabytes (GB), which is impossible given this limit. Another benefit of this approach is that the PKC never leaves the bounds of the cryptographic device.

In an alternative embodiment, the cryptographic device sends the internal state (of inputting the PKC into a hash function) to the client. Thereafter, the client updates the internal state of its hash function with the received internal state and inputs the message and any fixed data to the hash function to generate a new internal state. The client then finalizes the new internal state to generate the hash. The client then sends the hash to the cryptographic device, which signs the hash and returns the signature (and, optionally, the hash) to, for example, the client or a recipient delegated by the client.

The internal state of hashing a PKC is not a significant amount of risk exposure, since the internal state is based on less than the entirety of the PK and the internal state masks the PKC. It is theoretically impossible to derive the original input from the internal state. What the client can do with the internal state (that is based on a PKC) in theory depends on how much of the PK is used and how secure the hash function is. For example, early hash functions have been figured out so that it is possible to discover the original PKC. For example, MD5 is one such hash function and has been banned in most cases due to this reason.

In an embodiment, a proxy server rate limits clients (e.g., one a day). Additionally or alternatively, a cryptographic device does rate limiting so that the internal state, of a hash function, that is based a PKC does leave the secure bounds of the cryptographic device too often. A rate limit for PKCs whose internal states are shared with clients may be lower than (meaning less sharing) a rate limit for PKCs whose internal states are not shared with clients.

Prepend and Append

In an embodiment, a hash is generated using both the prepending of a PKC and an appending of a PKC. For example, a client sends, to a cryptographic device, a request for the internal state of a PKC. The cryptographic device responds with the internal state (which may have been generated previously, therefore avoiding an on-the-fly generation). The client then uses the internal state in its hash function and inserts the message (and, optionally, fixed data) into the hash function, thus modifying the internal state to result in a new internal state. The client then sends the new internal state to the cryptographic device, which uses the new internal state in its hash function and inserts the PKC (or a different PKC) into the hash function, resulting in a newer internal state, from which the cryptographic device ultimately generates the final state (i.e., hash) using the hash function. The cryptographic device then generates a digital signature based on the hash and returns the digital signature and hash to, for example, the client.

Example Append Process

Figure 2:
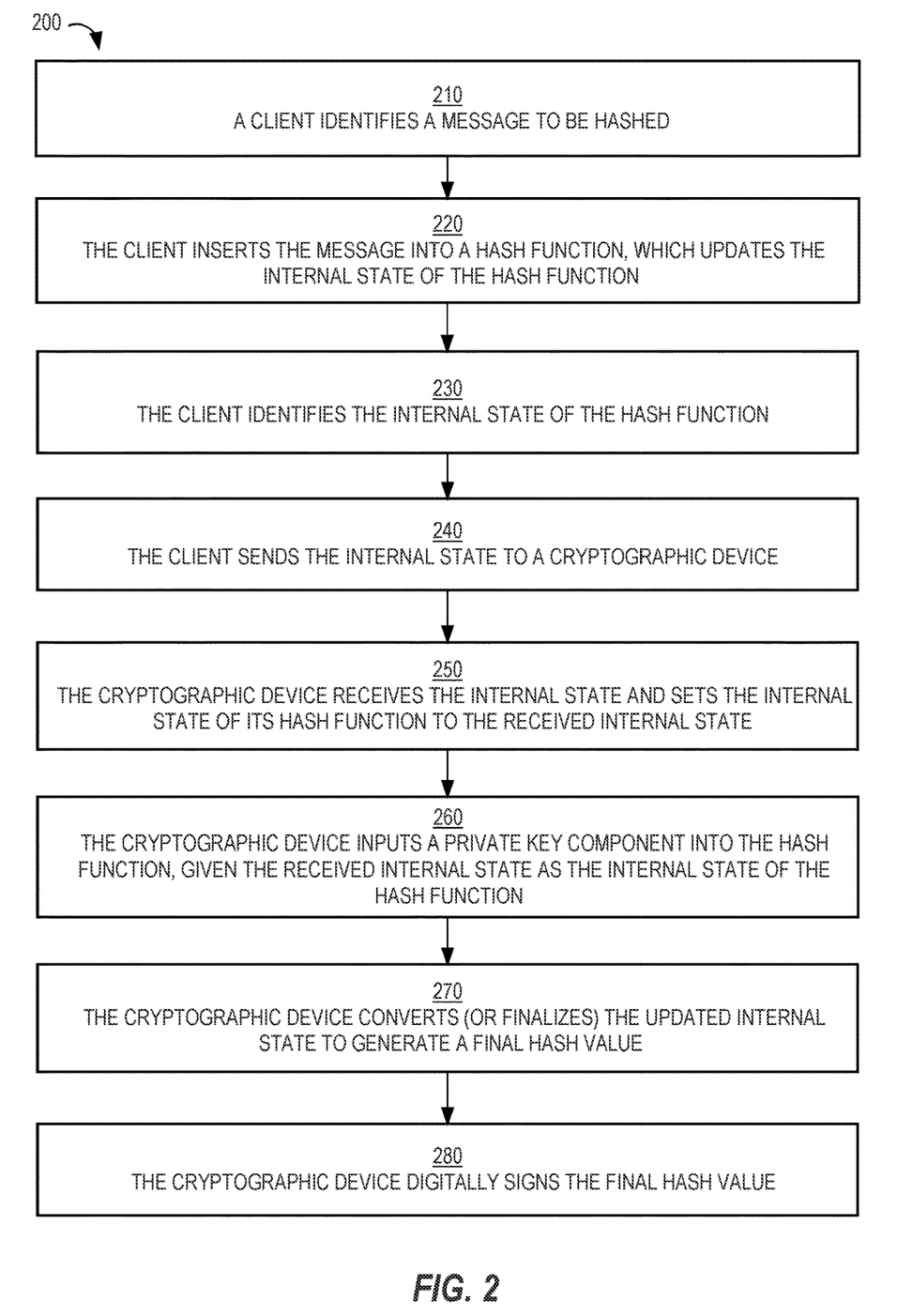
FIG. 2 is a flow diagram that depicts an example process for appending a private key component to the internal state of a hash function, in an embodiment.

FIG. 2 is a flow diagram that depicts an example process 200 for appending a private key component to the internal state of a hash function, in an embodiment.

At block 210, a client identifies a message to be hashed. Block 210 may involve a user of the client providing one or more inputs that specify the message and an instruction to generate a hash value based on the message. One of the inputs may also specify an append instruction, a prepend instruction, or a combination of the two instructions.

At block 220, the client inserts the message into a hash function that the client implements, which results in changing the internal state of the hash function, which internal state may initially be in an initial state, such as all zeros. Block 220 may also include the client inserting fixed data into the hash function either before inputting the message into the hash function or after inputting the message into the hash function.

At block 230, the client identifies the internal state of the hash function, where the internal state is an intermediate state that is before the internal state is finalized into a hash.

At block 240, the client sends the internal state to a cryptographic device. Block 240 may involve the client generating a hash request that includes the internal state. The hash request may indicate (e.g., through a bit or byte or other value in a header of the request) that the hash request includes internal state data, as opposed to a final hash value. The hash request may also include instructions, such as which inputs to a hash function (that the cryptographic device implements) the cryptographic device is to provide (e.g., fixed data, which PKC, etc.) after setting the internal state of the hash function to the internal state in the hash request.

Block 240 may involve the client sending the internal state to a proxy server that is communicatively coupled to both the client and the cryptographic device. In this embodiment, the proxy server forwards the internal state to the cryptographic device.

At block 250, the cryptographic device receives the internal state and sets the internal state of a hash function (which state may be in an initial state) to the received internal state.

At block 260, the cryptographic device inputs a private key component into the hash function, given the received internal state as the internal state of the hash function. A result of block 260 is a second internal state.

At block 270, the cryptographic device converts (or finalizes) the second internal state to generate a final hash value. Block 270 may also involve the cryptographic device inputting fixed data to the hash function (which has an internal state of the second internal state) before the conversion takes place. Alternatively, the cryptographic device may input the fixed data into the hash function before inputting the private key component into the hash function. At block 280, the cryptographic device digitally signs the final hash value.

Example Prepend Process

Figure 3:
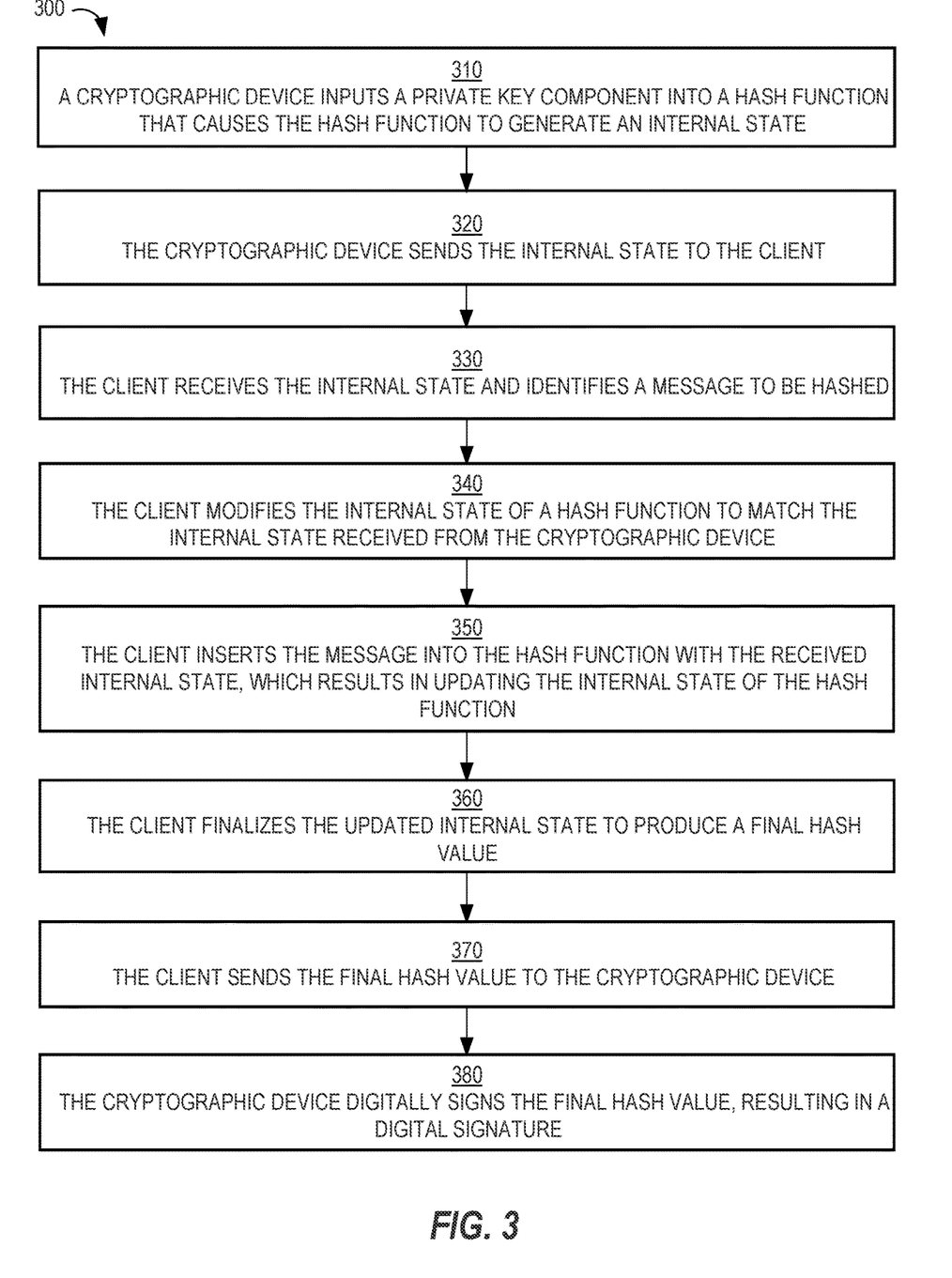
FIG. 3 is a flow diagram that depicts an example process for prepending a private key component to the internal state of a hash function, in an embodiment.

FIG. 3 is a flow diagram that depicts an example process 300 for prepending a private key component to the internal state of a hash function, in an embodiment.

At block 310, a cryptographic device inputs a private key component into a hash function that causes the hash function to generate an internal state, which is different than an initial state of the hash function. Block 310 may be triggered by the cryptographic device receiving a hash request from a client. Alternatively, block 310 may be performed prior to the cryptographic device receiving any hash request.

At block 320, the cryptographic device sends the internal state to the client. Block 320 may involve sending the internal state to a proxy server, which previously sent, to the cryptographic device, a hash request from the client. The internal state may be sent in a message that includes a client identifier that uniquely identifies the client or an identifier that was included in the hash request. The proxy server uses such an identifier to know where to forward the internal state.

At block 330, the client receives the internal state and identifies a message to be hashed. The message may have been selected by a user of the client, which stores message identification data that identifies the message or where the message is stored. In one implementation, the client also stores association data that associates the message identification data with a request identifier that identifies (or is associated with) the hash request. Then, in response to receiving the internal state, the client identifies the request identifier in the same response that includes the internal state and, using the association data, identifies the message.

At block 340, the client modifies the internal state of a hash function to match the internal state received from the cryptographic device. Thus, the cryptographic device and the client implement the same hash function.

At block 350, the client inserts (or inputs) the message into the hash function with the received internal state, which results in updating the internal state of the hash function. Block 350 may also include the client inserting fixed data into the hash function either before inputting the message into the hash function or after inputting the message into the hash function.

At block 360, the client finalizes the updated internal state to produce a final hash value.

At block 370, the client sends the final hash value to the cryptographic device. Again, if the client communicates with the cryptographic device through a proxy server, then the final hash value is sent (e.g., over a computer network) to the proxy server, which forwards the final hash value to the cryptographic device.

At block 380, the cryptographic device digitally signs the final hash value, resulting in a digital signature. Block 380 may also involve causing the digital signature (and, optionally, the final hash value, depending on, for example, whether the client generated the final hash value) to be sent to the client.

An alternative to the client generating the final hash value (in block 360), the client sends the updated internal state to the cryptographic device, which updates the internal state of its hash function with the received updated internal state. The cryptographic device may then input fixed data and/or another private key component into the hash function with the updated internal state. Such inputting eventually results in a final hash value that the cryptographic device digitally signs. In either embodiment, the cryptographic device transmits the digital signature to the client or to another computing entity.

Random Values

In an embodiment, one or more random values are added as part of signing. In some cases, the client generates the random value; in other cases, the proxy server/cryptographic device generates the random value; and in other cases, the cryptographic device generates the random value, or may even be required to do so. In some cases, this random value is not secret and is given as part of the signature value, which is the resulting digital signature of the data that is signed.

In an embodiment, the cryptographic device is required to generate some or all of the random data that is used and determines whether any of that random data must be prepended to the message before the hashing begins. If the random value(s) only need to be appended, then appending may be done against the internal state, of the hash function, that is sent by the client. If the random value(s) need to be prepended, then such prepending is done in a manner similar to that of the PKC.

Prepend and Client Sends X Bytes to Cryptographic Device

In an embodiment, in the prepending case, the client sends N bytes (of the beginning) of the message to the cryptographic device, which inserts those bytes and the PKC (and, optionally, any fixed data) into a hash function, which produces an internal state. The cryptographic device then sends the internal state of the hash function to the client, which completes the hash by inserting the message (and, optionally, fixed data) to its hash function given the internal state, which generates a new internal state. The client finalizes the new internal state to generate the hash. The client sends the hash to the cryptographic device for signing.

Enforcing Checks

In an embodiment, checks are enforced, such as based on the length of the message that the client sends. Checks may be performed on the cryptographic device, the proxy server (if any), or both. For example, the client must send at least 32 bytes to the proxy server (or to the cryptographic device), else the hash request is denied.

Another check is determining the type of data/message/file that is being signed based on the bytes that are sent. This determination may be based on checking a file header or a header of the hash request from the client. Example types include an xml file, a JSON file, a word processing document, a spreadsheet document, Java code, Python code, etc. Then a proxy server or cryptographic device enforces controls based on the type. For example, certain types of messages will not be signed while other types of messages are allowed to be signed.

In a related embodiment, the client tells the proxy server or cryptographic device the type of data and the cryptographic device inserts bytes corresponding to the type of data. This approach reduces the amount of data sent over the network between the client and the cryptographic device to a minimum. This approach also reduces the chances that the proxy server and the cryptographic device misclassify the data. For example, the proxy server or cryptographic device might misclassify data as an accepted type and then create an internal state based on the data and later digitally sign the resulting hash. As another example, the proxy server or cryptographic device might misclassify data as an unaccepted type and, therefore, deny a request for internal state and a subsequent signed hash.

When receiving a hash request that specifies a data type (e.g., an XML file or a Word document) and requests an internal state based thereon, the proxy server or cryptographic device might have previously generated the corresponding internal state and, therefore, does not have to generate the corresponding internal state on-the-fly. Thus, prior to any hash request, the proxy server/cryptographic device stores a set of internal states, each internal state corresponding to a different data type.

Rotating PKs

In an embodiment, a private key whose PKC has been used to generate an internal state is aged out over time. For example, after one year of use in this manner, the PK is retired or no longer used, or at least not used for a period of time (e.g., 3 months) before being used again. As another example, after a certain number of times a PKC is used in this manner (i.e., prepending or appending) is the PK aged out. Such aging may be different for PKs that are not used in this manner. For example, a PK1 is aged out faster (e.g., 3 months) when used in this internal state manner, whereas a PK2 is aged out "normally" (e.g., 9 months). As another example, a PK1 whose PKC leaves the bounds of its cryptographic device is aged out faster than a PK2 whose PKC does not leave the bounds of its cryptographic device but is used to generate an internal state, and the PK2 is aged out faster than a PK3 whose PKC is not used to generate an internal state at all.

Secure Enclave

In an embodiment, the proxy server or cryptographic device communicates with a secure enclave on the client and ensures that all this communication and hashing is done in the secure enclave. If the client does not have a secure enclave, then the proxy server or cryptographic device refuses to communicate with the client or at least to respond with requested data of a hash request. The proxy server or cryptographic device may "know" whether it is communicating with a secure enclave via attestation. That is, the secure enclave provides some cryptographic proof with one or more keys that chain up to a hardware root of trust (i.e., was signed by the manufacturer when the secure enclave was produced). When such cryptographic proof is not possible, one can pre-share credentials between the cryptographic device (or proxy server) and the secure enclave and assume that any entity that has the credentials must be the secure enclave.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
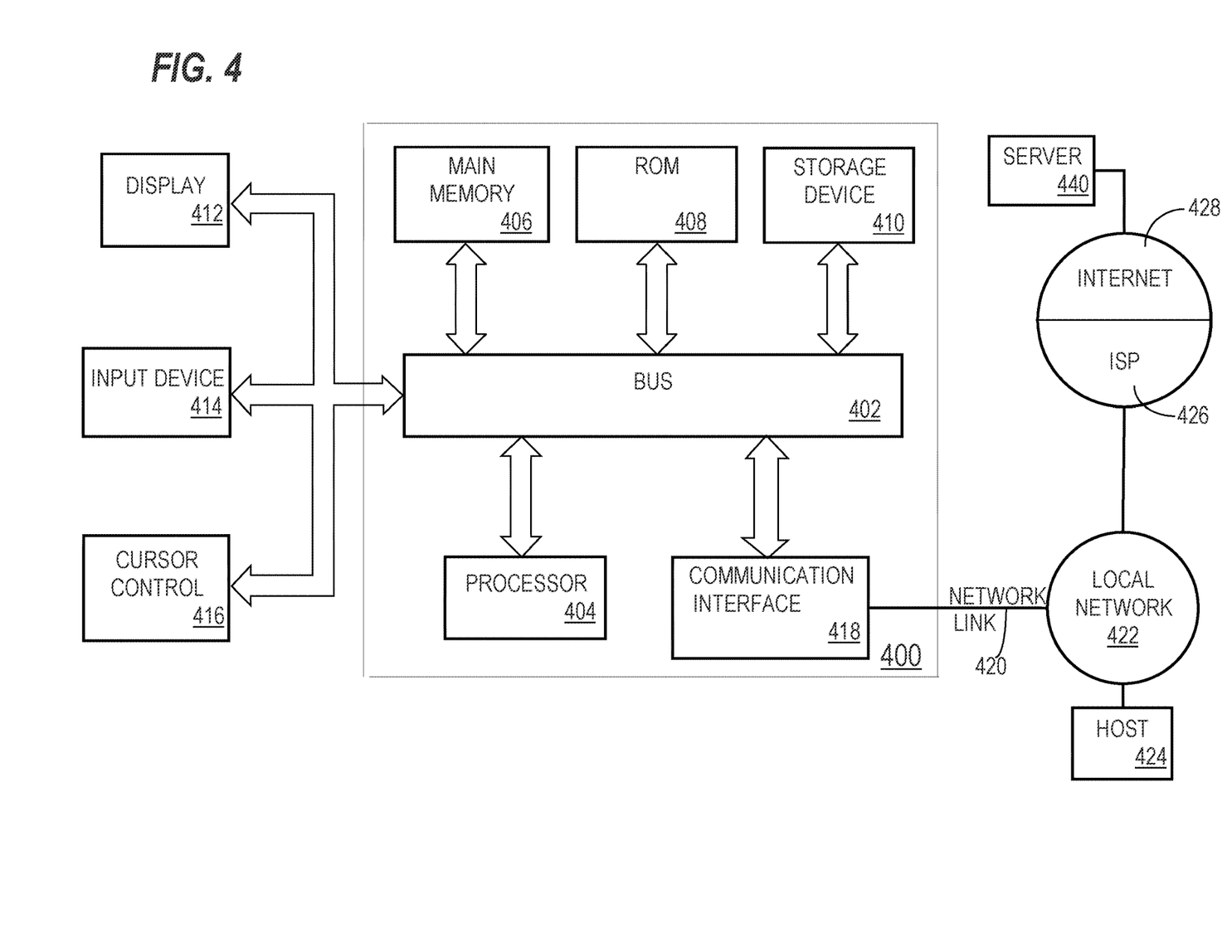
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   identifying, by a client, a message that is to be hashed with a private key component;
   inputting, by the client, the message into a hash function;
   identifying, by the client, an internal state of the hash function, wherein the internal state is based on the message and not based on any key of a cryptographic device;
   sending, from the client, the internal state to the cryptographic device that implements the same hash function, wherein the internal state is an intermediate state that is before the internal state is finalized into a hash value;
   receiving, from the cryptographic device, a digital signature that is based on a hash that is based on the message and the private key component;
   wherein prior to receiving the digital signature from the cryptographic device, the cryptographic device has identified the private key component, updated an internal state of the hash function on the cryptographic device to be the internal state identified by the client, and generated a final hash based on the internal state of the hash function and the private key component;
   wherein the method is performed by one or more computing devices.

2. The method of claim 1, wherein:
   sending the internal state comprises sending the internal state to a proxy server, which forwards the internal state to the cryptographic device;
   receiving the digital signature comprises receiving the digital signature from the proxy server.

3. The method of claim 1, further comprising:
   inputting, by the client, fixed data into the hash function either before inputting the message into the hash function, or after inputting the message into the hash function;
   wherein the internal state that is sent to the cryptographic device is also based on the fixed data.

4. The method of claim 1, further comprising:
   prior to inputting the message into the hash function, receiving an instruction to generate a hash value based on the message, wherein the instruction is an append instruction to append a component of a private key to the internal state of the hash function.

5. The method of claim 1, further comprising:
   generating a hash request that includes the internal state and indicates that the hash request includes internal state data;
   wherein sending the internal state comprises sending the hash request.

6. The method of claim 5, wherein the hash request also indicates which inputs to the hash function that the cryptographic device is to provide after the cryptographic device sets the internal state of its hash function to the internal state in the hash request.

7. The method of claim 1, further comprising:
generating random data;
inputting the random data into the hash function, wherein the internal state is also based on the random data.

8. A method comprising:
receiving, by a cryptographic device, from a client, a first internal state of a first hash function implemented on the client, wherein the first internal state is based on the client inputting a message into the first hash function and is not based on any key of the cryptographic device, wherein the first internal state is an intermediate state that is before the first internal state is finalized into a hash value;
replacing an internal state, of a second hash function that is the same as the first hash function and that is implemented by the cryptographic device, with the first internal state;
inputting, by the cryptographic device, a component, of a private key that the cryptographic device stores, into the second hash function, wherein inputting the component changes a current internal state of the second hash function to a second internal state that is different than the first internal state;
generating, based on the second internal state of the second hash function, using the second hash function, a final hash;
generating a digital signature of the final hash using the private key;
sending the digital signature to the client;
wherein the method is performed by one or more computing devices.

9. The method of claim 8, further comprising:
prior generating the final hash, sending, to the client, third internal state that is the second internal state or is based on the second internal state.

10. The method of claim 8, further comprising:
inputting fixed data into the second hash function, wherein inputting the fixed data into the second hash function changes a second current internal state of the second hash function to a third internal state, wherein the second current internal state is the second internal state or the second internal state is based on the third internal state.

11. The method of claim 8, further comprising:
receiving, from the client, a portion of the message;
determining, based on the portion, a type of data of the portion;
determining, based on the type of data, whether to generate the second internal state, based on the component of the private key, for the client.

12. The method of claim 8, further comprising:
receiving a data type selection that a user of the client selected;
based on the data type selection, determining whether to accept a request to generate internal state for the client.

13. The method of claim 8, wherein:
receiving the first internal state comprises receiving a hash request that includes the first internal state;
the hash request includes certain data;
the method further comprising, based on the size of the certain data, determining whether to respond to the hash request.

14. The method of claim 8, wherein replacing and inputting are performed only in response to determining that the client has a secure enclave.

15. One or more storage media storing instructions which, when executed by one or more processors, cause:
identifying, by a client, a message that is to be hashed with a private key component;
inputting, by the client, the message into a hash function;
identifying, by the client, an internal state of the hash function, wherein the internal state is based on the message and not based on any key of a cryptographic device;
sending, from the client, the internal state to the cryptographic device that implements the same hash function, wherein the internal state is an intermediate state that is before the internal state is finalized into a hash value;
receiving, from the cryptographic device, a digital signature that is based on a hash that is based on the message and the private key component;
wherein prior to receiving the digital signature from the cryptographic device, the cryptographic device has identified the private key component, updated an internal state of the hash function on the cryptographic device to be the internal state identified by the client, and generated a final hash based on the internal state of the hash function and the private key component.

16. The one or more storage media of claim 15, wherein:
sending the internal state comprises sending the internal state to a proxy server, which forwards the internal state to the cryptographic device;
receiving the digital signature comprises receiving the digital signature from the proxy server.

17. The one or more storage media of claim 15, wherein the instructions, when executed by the one or more processors, further cause:
inputting, by the client, fixed data into the hash function either before inputting the message into the hash function, or after inputting the message into the hash function;
wherein the internal state that is sent to the cryptographic device is also based on the fixed data.

18. The one or more storage media of claim 15, wherein the instructions, when executed by the one or more processors, further cause:
prior to inputting the message into the hash function, receiving an instruction to generate a hash value based on the message, wherein the instruction is an append instruction to append a component of a private key to the internal state of the hash function.

19. The one or more storage media of claim 15, wherein the instructions, when executed by the one or more processors, further cause:
generating a hash request that includes the internal state and indicates that the hash request includes internal state data;
wherein sending the internal state comprises sending the hash request.

20. The one or more storage media of claim 19, wherein the hash request also indicates which inputs to the hash function that the cryptographic device is to provide after the cryptographic device sets the internal state of its hash function to the internal state in the hash request.

21. One or more storage media storing instructions which, when executed by one or more computing devices, cause:
receiving, by a cryptographic device, from a client, a first internal state of a first hash function implemented on the client, wherein the first internal state is based on the client inputting a message into the first hash function and is not based on any key of the cryptographic device, wherein the first internal state is an intermediate state that is before the first internal state is finalized into a hash value;

replacing an internal state, of a second hash function that is the same as the first hash function and that is implemented by the cryptographic device, with the first internal state;

inputting, by the cryptographic device, a component, of a private key that the cryptographic device stores, into the second hash function, wherein inputting the component changes a current internal state of the second hash function to a second internal state that is different than the first internal state;

generating, based on the second internal state of the second hash function, using the second hash function, a final hash;

generating a digital signature of the final hash using the private key;

sending the digital signature to the client.

22. The one or more storage media of claim 21, wherein the instructions, when executed by the one or more computing devices, further cause:

prior generating the final hash, sending, to the client, third internal state that is the second internal state or is based on the second internal state.

23. The one or more storage media of claim 21, wherein the instructions, when executed by the one or more computing devices, further cause:

inputting fixed data into the second hash function, wherein inputting the fixed data into the second hash function changes a second current internal state of the second hash function to a third internal state, wherein the second current internal state is the second internal state or the second internal state is based on the third internal state.

24. The one or more storage media of claim 21, wherein the instructions, when executed by the one or more computing devices, further cause:

receiving, from the client, a portion of the message;

determining, based on the portion, a type of data of the portion;

determining, based on the type of data, whether to generate the second internal state, based on the component of the private key, for the client.

25. The one or more storage media of claim 21, wherein the instructions, when executed by the one or more computing devices, further cause:

receiving a data type selection that a user of the client selected;

based on the data type selection, determining whether to accept a request to generate internal state for the client.

26. The one or more storage media of claim 21, wherein:

receiving the first internal state comprises receiving a hash request that includes the first internal state;

the hash request includes certain data;

the instructions, when executed by the one or more computing devices, further cause, based on the size of the certain data, determining whether to respond to the hash request.

27. The one or more storage media of claim 21, wherein replacing and inputting are performed only in response to determining that the client has a secure enclave.

* * * * *